United States Patent [19]

Hashimoto

[11] Patent Number: 4,774,596

[45] Date of Patent: Sep. 27, 1988

[54] ELECTRONIC DICTIONARY USING A VIDEO DISK IN AN INFORMATION RETRIEVAL SYSTEM

[75] Inventor: Shintaro Hashimoto, Ikoma, Japan

[73] Assignee: Sharp Kabushiki Kaisha, Osaka, Japan

[21] Appl. No.: 68,780

[22] Filed: Jun. 29, 1987

Related U.S. Application Data

[63] Continuation of Ser. No. 732,806, May 10, 1985, abandoned, Continuation of Ser. No. 368,012, May 13, 1982, abandoned.

[30] Foreign Application Priority Data

Apr. 17, 1981 [JP] Japan ................................. 56-59493

[51] Int. Cl.$^4$ .......................... H04N 5/91; H04N 5/78
[52] U.S. Cl. ..................................... 358/335; 358/341; 358/342; 358/310; 358/312; 360/10.1; 360/35.1; 369/32; 369/43; 369/44; 364/419
[58] Field of Search ............... 358/310, 312, 332, 335, 358/341–345; 360/9.1, 10.1, 13, 14.3, 18, 19.1, 33.1, 35.1; 354/7; 365/124–126; 369/30, 32, 33, 41, 43, 100, 103, 109, 125; 355/53, 64, 65; 364/41 G; 353/2 TR, 2 A, 26 A

[56] References Cited

U.S. PATENT DOCUMENTS

| | | | |
|---|---|---|---|
| 3,312,946 | 4/1967 | Craft et al. ............................ | 364/900 |
| 3,781,809 | 12/1973 | Murakoshi et al. ................. | 353/27 X |
| 3,792,440 | 2/1974 | Murakoshi ........................... | 353/27 X |
| 4,122,533 | 10/1978 | Kubinak ............................... | 364/900 |
| 4,139,898 | 2/1979 | Tanaka ................................. | 364/900 |
| 4,142,209 | 2/1979 | Hedlund et al. ..................... | 358/342 |
| 4,158,236 | 1/1979 | Levy .................................... | 364/419 X |
| 4,161,753 | 7/1979 | Bailey et al. ........................ | 360/18 X |
| 4,213,163 | 7/1980 | Lemelson ........................... | 360/13.1 X |
| 4,229,808 | 10/1980 | Hui ...................................... | 358/342 X |
| 4,321,635 | 3/1982 | Tsuyuguchi ........................ | 369/32 X |
| 4,353,090 | 10/1982 | Broadbent ......................... | 358/343 X |
| 4,361,849 | 11/1982 | Bolger ................................ | 358/312 |
| 4,383,279 | 5/1983 | Kenney, II ......................... | 358/341 |
| 4,412,305 | 10/1983 | Yoshida ............................. | 364/900 |
| 4,463,389 | 7/1984 | Golding ............................. | 358/343 |
| 4,486,780 | 12/1984 | Ive ..................................... | 360/36.2 X |
| 4,587,635 | 5/1986 | Hashimoto et al. .............. | 358/342 X |
| 4,626,912 | 12/1986 | Wilkinson ........................ | 358/339 X |
| 4,627,023 | 12/1986 | Hashimoto et al. .............. | 364/419 X |

FOREIGN PATENT DOCUMENTS

| | | |
|---|---|---|
| 891338 | 3/1962 | United Kingdom . |
| 1018330 | 1/1966 | United Kingdom . |
| 1525461 | 8/1969 | United Kingdom . |
| 1162840 | 8/1969 | United Kingdom . |
| 1172508 | 12/1969 | United Kingdom . |
| 1387032 | 3/1972 | United Kingdom . |
| 1291556 | 10/1972 | United Kingdom . |
| 1361660 | 4/1974 | United Kingdom . |
| 1448211 | 9/1976 | United Kingdom . |
| 2014765 | 8/1979 | United Kingdom ............. 364/419 |
| 2098767 | 11/1982 | United Kingdom . |

OTHER PUBLICATIONS

"Special Purpose Applications of the Optical Videodisc System", Kenney, IEEE Transactions on Consumer Electronics, Nov. 1976, pp. 327–337.

"A Random Access System Adapted for the Optical Videodisc; Its Impact on Information Retrieval", Mathieu, SMPTE Journal, vol. 86, Feb. 1977.

"A Review of the MCA Disco-Vision System", Broadbent, SMPTE, vol. 83, Jul. 1974, pp. 554–559.

UK Patent Application 2014765 to Son et al., Aug. 30, 1977, Portable Translator Device.

*Primary Examiner*—Aristotelis M. Psitos
*Attorney, Agent, or Firm*—Birch, Stewart, Kolasch, & Birch

[57] ABSTRACT

An information retrieval system adapted for an electronic dictionary comprises, an input device actuated for entering an entered word, a memory circuit adapted for storing a word equivalent to the entered word and the number of a track related to the word, a video disk for recording information related to the word, the information being random accessed, and an access circuit responsive to the number of the track specified by the memory circuit for accessing the video disk to access the information from the video disk.

12 Claims, 5 Drawing Sheets

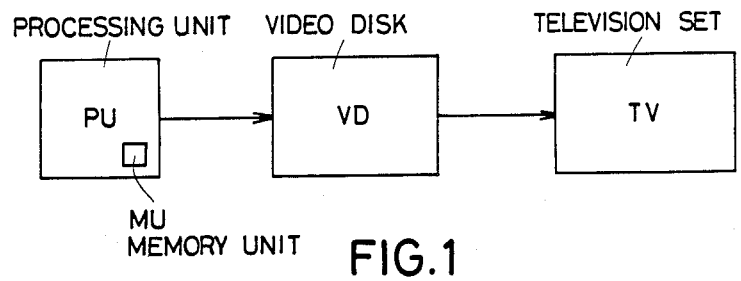
FIG. 1
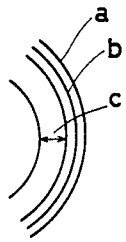
FIG. 2
FIG. 3
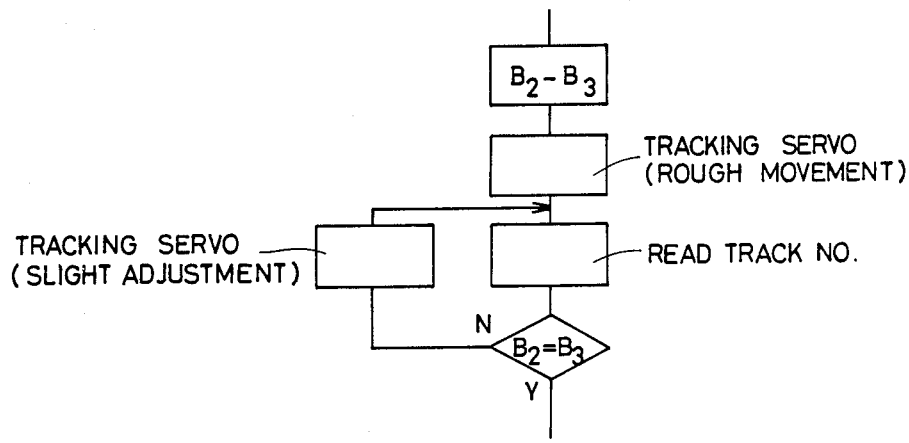
FIG. 8

FIG. 6 (1)

```
┌─────────────────────────────────────┐
│  ┌─────┐                            │
│  │able │                            │
│  └─────┘                            │
│  a·ble [éibl] [adj] (abler ablest)  │
│   1. be able to                     │
│      have the power to (do something)│
│                                     │
│                                     │
│   2. showing knowledge or skill     │
│                                     │
└─────────────────────────────────────┘
```

FIG. 6 (2)

```
┌─────────────────────────────────────┐
│  ┌─────┐                            │
│  │able │                            │
│  └─────┘                            │
│   be able to (do)                   │
│      I have been able to do this task.│
│                                     │
│                                     │
│  -able [suffix]                     │
│    eatable                          │
│                                     │
└─────────────────────────────────────┘
```

ELECTRONIC DICTIONARY USING A VIDEO DISK IN AN INFORMATION RETRIEVAL SYSTEM

This application is a continuation of application Ser. No. 732,806, filed on May 10, 1985, now abandoned, which is a continuation of Ser. No. 368,012, filed 5/13/82, now abandoned.

BACKGROUND OF THE INVENTION

The present invention relates to an information retrieval system and, more particularly, an information retrieval system equipped with a random-accessible memory medium such as a video disk.

Recently, electronic devices called electronic dictionaries have become available on the market. The electronic dictionaries require efficient and rapid retrieval of word information stored in a ROM. An example of such electronic dictionaries is disclosed in Levy U.S. Pat. No. 4,158,236, June 12, 1979, "ELECTRONIC DICTIONARY AND LANGUAGE INTERPRETER". The disclosure of this patent is incorporated herein by reference.

Since the capacity of the ROM is limited, it is desirable to replace the ROM with another type of memory. In this respect, the video disk is worth considering. Since the video disk is random-accessible, it might be employed as part of an improved information retrieval system.

However, a practical system suitable for retrieving information such as word information processed in the electronic dictionary has not previously been proposed.

In the video disk, the information such as the word information must be memorized in the form of digital codes. In such a case, careful consideration should be directed to the problem that dust on the video disk may cause error in reading out the video disk.

Further, when the video disk provides a still picture, the same tracks of the video disk are repeatedly traced, so that it was impossible to simultaneously speak the work information. This was a disadvantage for the electronic dictionary. Since, in a single track of the video disk, the visual signals forming a single still television picture, the aural signals and the address signals are superposed, the repetition of the tracing on the same single track provides the single and still television picture. However, because the round length of the single track can be traced for a very short time, about $30^{-1}$ to $60^{-1}$ sec., the data of the aural signals developed in accordance with the tracing of the single track are too small to provide pronunciation, as one reads, with the data. The reproduction of the data may cause only noise.

SUMMARY OF THE INVENTION

Accordingly, it is an object of the present invention to provide an improved information retrieval system equipped with a video disk.

It is another object of the present invention to provide an improved electronic dictionary for developing word information stored in a video disk.

It is a further object of the present invention to provide an improved electronic dictionary for simultaneously developing a picture and voice information related to the picture in response to the introduction of an entry word to the electronic dictionary.

Briefly described, in accordance with the present invention, an information retrieval system adapted for an electronic dictionary comprises an input means actuated for entering an entry word, a memory means adapted for storing a word equivalent to the entry word and the number of a track related to the word, a video disk means for recording information related to the word, the information being randomly accessed, and an access means responsive to the number of the track specified by the memory means for accessing the video disk means to access the information from the video disk means.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 shows an information retrieval system adapted for an electronic dictionary according to the present invention;

FIG. 2 shows tracks of a video disk for recording information the video disk being connected to form the system of FIG. 1;

FIG. 3 shows the contents of a memory unit contained in a processing unit of FIG. 1;

FIGS. 6(1) and 6 (2) show exemplary pictures displayed on a screen of a television set in FIG. 1;

FIG. 8 shows a flowchart of the operation of the video disk.

DESCRIPTION OF THE PRESENT INVENTION

Figure 4:
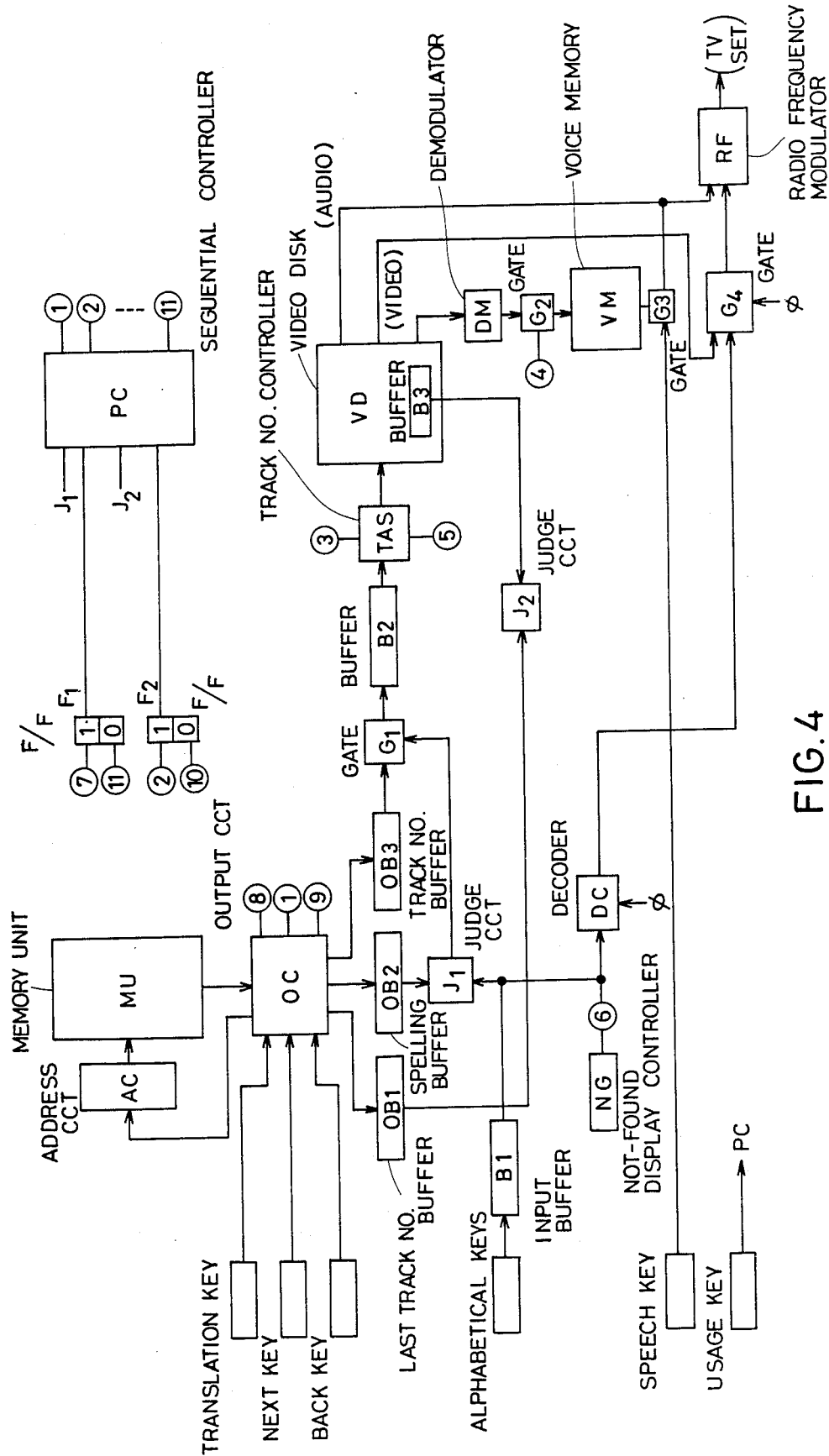
FIG. 4 shows a block diagram of circuits of the processing unit and the video disk in the system of FIG. 1.

The video disk is adapted for an information retrieval system including an electronic dictionary according to the present invention. With the random-accessible memory feature of the video disk, it is used as a memory for storing data such as word information in the electronic dictionary.

The video disk records television visual signals, aural signals and address signals all superposed on an optical or another type of disk in a modulated form as a row of pits. Such a video disk can record television picture signals for providing several tens of thousands of television pictures. Moving pictures can be outputted by accessing the respective address signals. When the pictures are continuously read out, they can provide voice information enabling a device to speak.

In the video disk adapted for the present invention, digital codes are recorded in addition to the visual signals and are modulated in a pulse-code modulation (PCM). The video disk may employ laser beam to read indentations on the disk and produce the television pictures and the sound, which is adapted for the present invention.

FIG. 1 shows an information retrieval system adapted for an electronic dictionary according to the present invention. According to a preferred embodiment of the present invention, the electronic dictionary is referred to as an English-English dictionary. It may be evident that any other type of language dictionary can be provided within the spirit and the scope of the present invention.

The information retrieval system of FIG. 1 comprises a processing unit PU, a video disk VD, and a television set TV. The processing unit PU is provided for inputting the spelling of a particular word processed in the electronic dictionary. By performing necessary key operations as will be described below, tracks of the video disk are accessed to provide the visual and aural information into the television set. FIG. 2 shows the tracks of the video disk for recording the television visual signals, the aural signals and the address signals.

In FIG. 2, "a" is a single track of PCM for recording the aural signals for voice information, so that the entry word (or one or more translated words) is pronounced. "b" is a track for recording a single still television picture to show a translated word or words equivalent to the particular entry word. "c" represents tracks for recording the moving television pictures used to explain the usage of the particular entry word. The number of the tracks referred to "c" is dependent upon the type of word. The still television picture might be recorded in the single track referred to "c".

The combination of the tracks "a", "b" and "c" forms the full information for the single particular word. The information of another word is recorded in the tracks adjacent the tracks "a", "b" and "c".

FIG. 3 shows the contents of a memory unit MU contained in the processing unit PU. The format of FIG. 3 is recorded in the memory unit. Preferably, this memory unit is a ROM.

With respect to the single particular word, a track no. and the last track no. are paired. The track no. is the number of the track "b" of FIG. 2. The last track no. is the number corresponding to the last track included in the tracks "c" of FIG. 2. Preferably, the memory unit MU stores the word information in the A-Z alphabetical arrangement. The video disk records the information also in the A-Z alphabetical arrangement.

Therefore an another embodiment of the present invention, the track number referred to the last track no. of a particular word by backing up two tracks from the next particular word track number, the last track number can be determined or calculated can be calculated on the basis of the track number referred to as the track no. of the next particular word. The recording of the last track no. may therefore be avoided.

Figure 5:
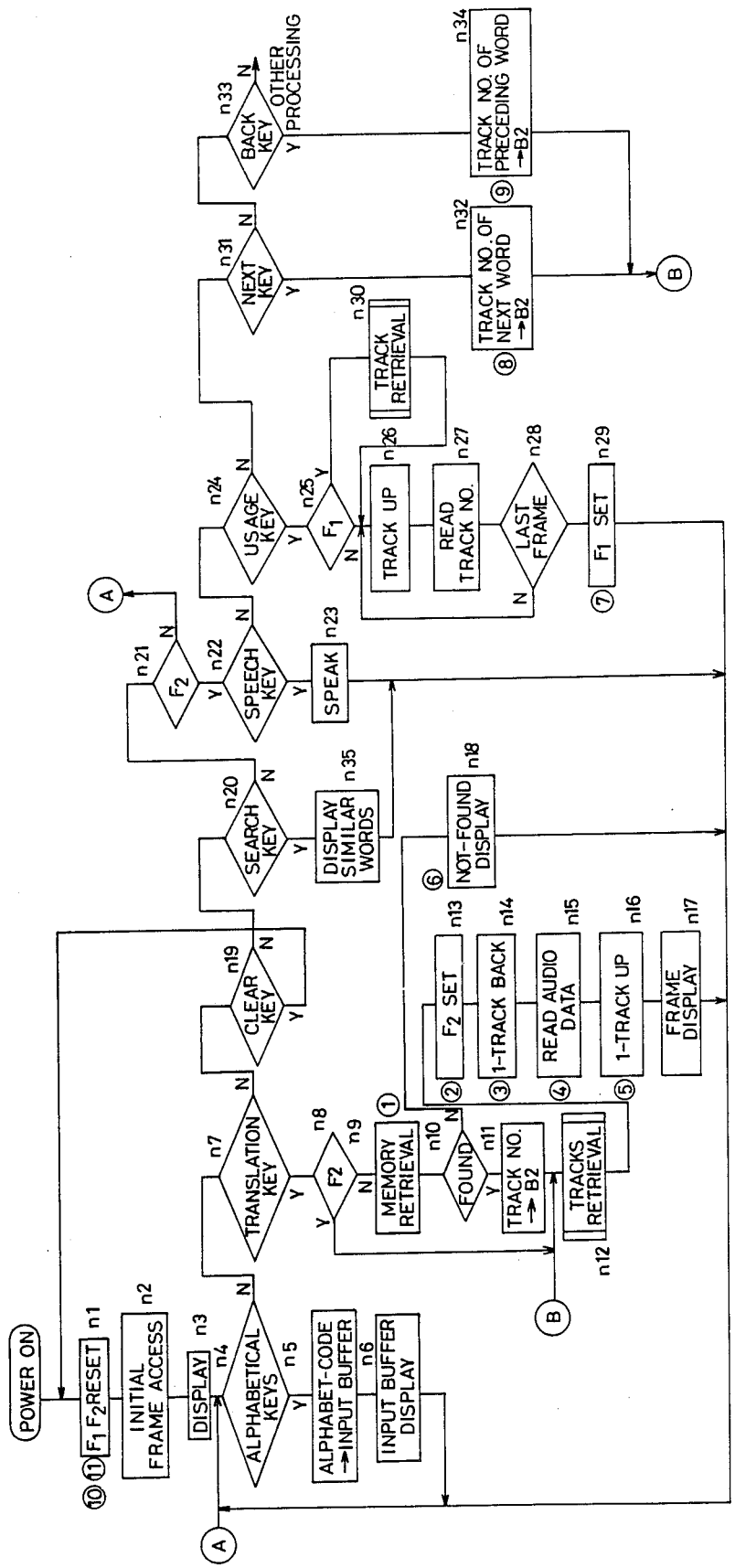
FIG. 5 shows a flowchart of the operation of the system as shown in FIG. 1.

FIG. 4 shows a block diagram of circuits of the processing unit PU and the video disk VD. FIG. 5 shows a flowchart of the operation of the electronic dictionary as shown in FIG. 1. FIGS. 6(1) and 6(2) show the television pictures on a screen of the television set TV.

The key operations of the respective key switches contained within the processing unit PU and the displays related to the key switches will be described before the description of the block diagram of FIG. 4.

The key switches contained within the processing unit PU are alphabetical keys, a translation key, a usage key, a next key, a back key and a speech key.

The alphabetical keys are actuated to enter the spellings of entered words. The translation key is actuated to display each of the television pictures showing the information of translated words equivalent to the entry words entered. Responsive to the actuation of the translation key, each of the entry words is retrieved from the memory unit MU to detect the track no. related to each of the entry words. The track associated with the track no. detected is thus accessed. Just preceding the displaying of the television pictures, the track just preceding the tracks related to the television pictures is accessed to load the voice information into a memory.

FIG. 6(1) shows the television picture displayed at this state by the operation of the translation key.

At this step, the speech key is actuated for pronouncing the entry word (or the translated words) based on the voice information loaded in the memory.

Further, the usage key is actuated for displaying the television pictures for explaining the usages of the entry word as shown in FIG. 6(2). In this specific form of the present invention, the television picture for explaining the usages is still. The spelling of the entry word is superimposed on the top of the left margin in the television pictures of FIGS. 6(1) and 6 (2).

When the next key is actuated, a word "abnormal" next to the word "able" is selected. When the back key is actuated, a word back from the word "able" is selected. Anyway, the television pictures showing one or more translated words equivalent to the word selected and the usage of the selected word can be displayed.

Turning back to FIGS. 4 and 5, the circuit of FIG. 4 comprises the memory unit MU, an address circuit AC, an output circuit OC, output buffers $OB_1$ to $OB_3$, an input buffer $B_1$, judge circuits $J_1$ and $J_2$, gates $G_1$ to $G_4$, buffers $B_2$ and $B_3$, a track no. controller TAS, the video disk VD, a demodulator DM, a voice memory VM, a radio frequency modulator RF, a sequential controller PC, flip flops $F_1$ and $F_2$, a decoder DC, and a controller NG for a not-found display.

The address circuit AC is operated to access the memory unit MU. The output circuit OC is operated to control the output from the memory unit MU. The output buffer $OB_1$ buffers the last track no. The output buffer $OB_2$ buffers the spelling of the entry word.

The output buffer $OB_3$ buffers the track no. The judge circuit $J_1$ is operted to detect the correspondence between the contents of the input buffer $B_1$ and those of the output buffer $OB_2$. The buffer $B_2$ buffers the track no. selected. The buffer $B_3$ buffers the track no. The judge circuit $J_2$ is operated to detect the correspondence between the contents of the output buffer $OB_1$ and those of the output buffer $B_3$. The flip flop $F_1$ is controlled by actuating the usage key. The flip flop $F_2$ is controlled by actuating the translation key.

The sequential controller PC is responsive to the outputs generated from the judge circuits $J_1$ and $J_2$, and the flip flops $F_1$ and $F_2$ to develop eleven micro orders ①to ⑪ These micro orders are applied to the respective circuit elements as shown in FIG. 4. These micro orders are referred to in the related steps of the flowchart of FIG. 5.

With reference to the flowchart of FIG. 5, the operational steps of the circuit of FIG. 4 are as follows;

$n_1 \rightarrow n_3 \rightarrow n_4 \rightarrow n_5 \rightarrow n_6$:

Firstly, the flip flops $F_1$ and $F_2$ are reset. The initial television picture is accessed and displayed. The initial television picture is to explain the operating method of the present electronic dictionary. The information for the initial television picture is recorded on a certain track.

The spelling of a certain entered word is inputted by actuating the alphabetical key switches. The code representative of the spelling is applied to the input buffer $B_1$, so that the spelling of the entered word is displayed on the television screen. That is, the contents of the input buffer $B_1$ are decorded by the decoder DC. The decorded information is transferred through the gate $G_4$ operated by the timing of a clock pulse $\phi$. Then, the spelling of the entered word is superimposed on the television.

The video signal generated from the video disk VD is transferred also to the radio frequency modulator RF through the gate $G_4$.

$n_7 \rightarrow n_8 \rightarrow n_9$:

After the entered word has been inputted, the translation key is actuated, so that the entered word is retrieved from the memory unit MU.

$n_{10} \rightarrow n_{11} \rightarrow n_{12}$:

When a word corresponding to the entered word is detected, the track no. related to the word is applied to the buffer $B_2$. By the track no. detected, the video disk VD is retrieved according to a conventional retrieval method.

$n_{13} \rightarrow n_{14} \rightarrow n_{15} \rightarrow n_{16} \rightarrow n_{17}$:

When the track no. detected is retrieved, the flip flop $F_2$ is set. The track just preceding the track no. already retrieved is selected by backing the track, to be selected, by one. This track backed into contains the voice information as described above. The voice information is read in. Thereafter, the next track is re-selected to provide the information of the still television picture and display the still television picture as shown in FIG. 6(1).

$n_{18}$:

When no word corresponding to the entered word is detected in step $n_{10}$, "not-found" information is displayed on the television screen.

$n_{21} \rightarrow n_{22} \rightarrow n_{23}$:

When the speech key is operated during the display of the picture as shown in FIG. 6(1), the voice information is extracted from the memory to privide the pronunciation of the entered word. In the case of FIG. 6(1), the entered word "able" is pronounced.

$n_{24} \rightarrow n_{25} \rightarrow n_{26} \rightarrow n_{27} \rightarrow n_{28} \rightarrow n_{26}$:

When the usage key is actuated, the next tracks are retrieved to reproduce the television pictures recorded in the tracks following the tracks for displaying the pictures of FIG. 6(1). While the video disk provides the television pictures, the track nos. are read in and advanced until the track no. agrees with the last track no. stored in the buffer $OB_1$.

Therefore a moving television picture may be displayed. Simultaneously, the audio signals superposed are reproduced. After the final television picture is displayed, the flip flop $F_1$ is set in step $n_{29}$. In a case where the voice information is superposed also in the track of the final television picture, the voice information must be prohibited.

$n_{24} \rightarrow n_{25} \rightarrow n_{30} \rightarrow n_{26} \rightarrow$:

When the usage key is actuated, the selected track is retrieved again on account of the set condition of the flip flop $F_1$. The television pictures and the voice information for explaining the usage of the entered word are outputted.

$n_{31} \rightarrow n_{32} \rightarrow \text{\textcircled{B}} \rightarrow n_{12} \rightarrow n_{13} \rightarrow$:

When the next key is operated, the track no. related to the word next to the entered word is retrieved from the memory unit MU. The track no. retrieved is inputted to the buffer $B_2$. The word is next to the entered word in the memory unit MU. With respect to this word, the translated words and the usage are outputted, also.

Since the memory unit MU stores the words in the A-Z alphabetical arrangement and the track nos. thereof, the words can be searched in this arrangement.

When the back key is actuated, a word one word back from the entered word is selected for retrieval.

When a search key is actuated, words having the same characters in their starting characters as the characters entered by the alphabetical keys can be retrieved from the memory unit MU according to the search retrieval system in the conventional electronic dictionary.

The searched words and the characters inputted can be displayed in the television picture. When one of the searched words to be sought is displayed, the translation key can be operated to translate this one of the searched words.

When a clear key is operated, the same initial condition as that addressed by the set of the power-on condition is addressed.

Figure 7:
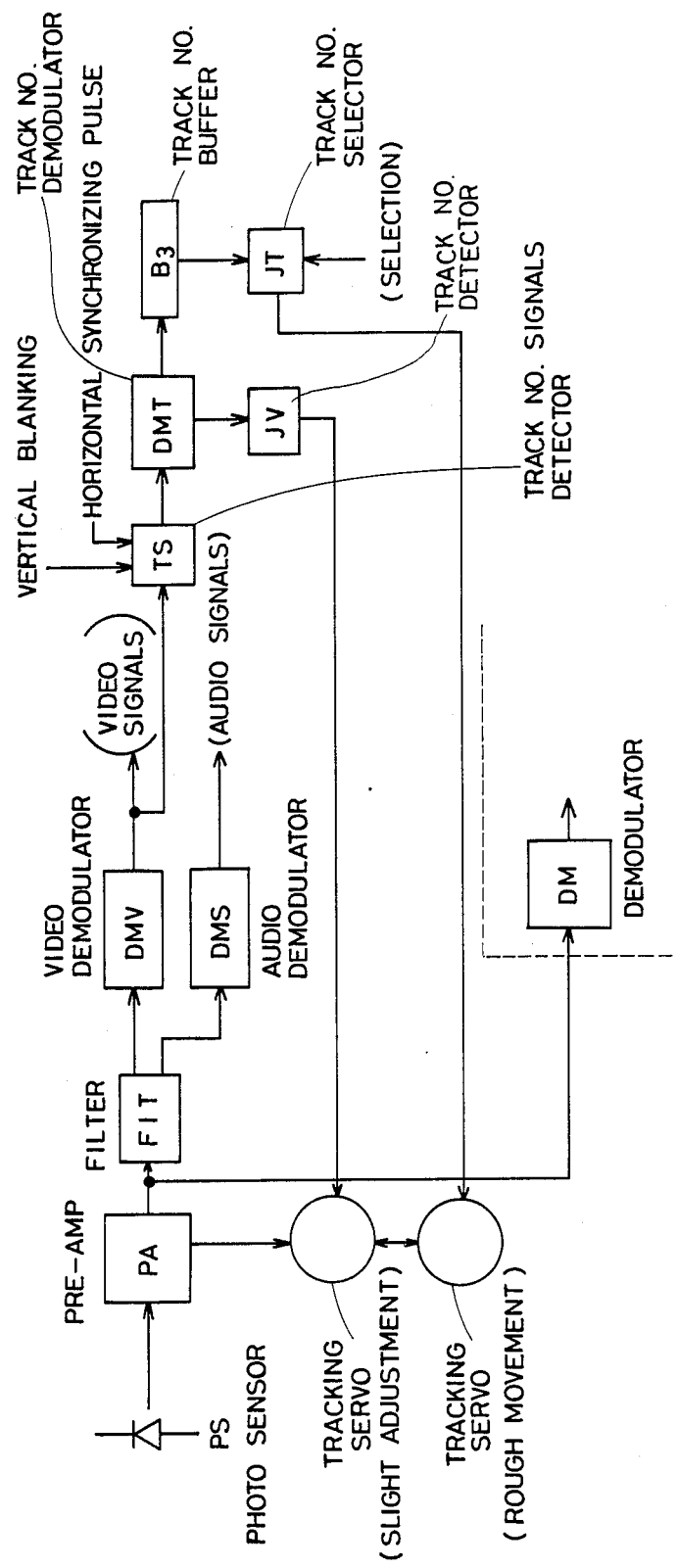
FIG. 7 shows a block diagram of an essential circuit for use with the video disk in FIG. 1.

FIG. 7 shows a block diagram of a circuit of an essential part of the video disk VD.

The video disk VD comprises a photosensor PS, a pre-amplifier PA, a filter FIT, a video signal demodulator DMV, an audio signal demodulator DMS, a track no. signals detector TS, a track no. signals demodulator DMT, a track no. detector JV, a track no. buffer $B_3$, and a track no. selector JT.

The filter FIT is provided for separating the carrier frequencies for the video signals and those for the audio signals. Since the track no. information is modulated and inserted in the vertical blanking of the video signals, the track no. signals detector TS is provided for detecting this timing. The modulated information of the track no. is demodulated by the track no. signals demodulator DMT.

In brief, the control of the track position is carried out by detecting the difference between the present track no. and the track no. selected. The servomotor is driven to provide control of tracking. The track no. inserted in the video signals stored in the tracks controlled is read out.

As indicated in FIG. 2, the track only for the audio signals is present, in which no track no. information is recorded. The track no. detector JV is provided for detecting whether the track no. information is present or not. When this detector JV detects that the track no. information is not present, the tracking error is detected, so that the next track is read out. Thus, the track for recording the information to be sought is read out and retrieved.

FIG. 8 shows a flowchart of the tracking operation.

As described above, in accordance with the present invention, the entered word externally introduced is retrieved from the memory to obtain the track no. On the basis of the track no., the information related to the entered word is read out and outputted from the vido disk. The video disk provides the voice information, which is stored in the buffer. Therefore, while the television still picture is being displayed, the voice information can be developed. Responsive to the introduction of the entered word, the television moving pictures are displayed.

In the above preferred embodiment of the present invention, the video disk records the information for the translated words equivalent to the entered word. The ROM memory unit stores the words for the entered words and their related track nos.

Further, within the knowledge of the present invention, the following modifications are possible:

1. The video disk produces the words for the entered words and their related track nos. rather than the ROM memory unit. For this purpose, a RAM should be used to receive these items of information from the video disk upon the power-on condition.

Conventionally, error may possibly occur in the video disk, so that error check codes must be added to prevent the error from occurring. Because the video disk produces the words for the entered words and their related track nos. in addition to the translated words information and the voice information, the video disk is self-contained to provide full information. When the respective video disks store different kinds of information, the dictionaries respectively directed to the different fields can be prepared. Dependent on the fields, the video disks can be changed.

2. The translated words equivalent to the single word are displayed on the television screen at the same time. It may be possible that many original words and many of their translated words are displayed on the screen at the same time as viewed in the conventionally printed dictionary. Then, the words and their derivatives can be easily found.

In addition, the next key and the back key can be operated to display the next picture and the back picture, respectively, so that the words may be searched, easily.

3. In place of the ROM, the memory unit can comprise a magnetic bubble memory or a mini-floppy disk memory which stores a great amount of data.

4. In place of the video disk using the laser beam in the above preferred embodiment, any other type of video disk including a type of electrostatic capacity can be adapted for the present invention.

5. In addition to the English-English dictionary or any other language dictionary, the present invention can be adapted for any dictionary including an encyclopedia.

While only certain embodiments of the present invention have been described, it will be apparent to those skilled in the art that various changes and modifications may be made therein without departing from the spirit and scope of the invention as claimed.

What is claimed is:

1. An electronic dictionary comprising:
   information disk means for recording information related to words to be defined or translated, said information related to each said word being stored on at least three tracks of an information storage disk including one track for storing voice information and at least two tracks for storing video information for each word, said video information including at least still display information, the number of tracks varying from word to word, said words to be defined or translated being alphabetically arranged on said disk;
   input means for introducing an entered word to be defined or translated;
   memory means for storing each of said words defined or translated on said disk and track number information corresponding to each of said words on said disk, said track number information including an initial track number and a last track number for said each of said words said initial track number represents the first track number of the video information, said last track number represents the last track number of the video information;
   means, responsive to said entered word, for searching said memory means to locate and recall said track number information of said entered word on said disk;
   means, responsive to said track number information corresponding to said entered word, located and recalled by said means for searching, for driving said disk to recall said related information located on the three or more tracks of said disk;
   means, responsive to said related information recalled by said means for driving said disk, for displaying said video information;
   means, responsive to said related information recalled by said means for driving said disk, for temporarily buffering said voice information related to said entered word stored at a voice track number of said disk for said entered word equal to one less than said initial track number;
   means, responsive to said means for temporarily buffering, for audibly developing said voice information simultaneous to said display of said video information by said means for displaying;
   buffer means for storing a present disk track number during display of said video information by said means for displaying; and
   means for determining an end of said three or more tracks having said information related to said entered word by comparing said present disk track number stored in said buffer means with said last track number and indicating said end of said three or more tracks when said present track number is equal to said last track number.

2. The dictionary of claim 1, wherein the input means comprises at least one selected from:
   alphabetical key switches actuated to enter the entry word;
   a speech key switch actuated to reproduce the voice information;
   a translation key switch actuated to translate the entry word;
   a usage key switch actuated to obtain usage of the entry word;
   a next key switch actuated to recall a word next to th entry word in the memory means; and
   a back key switch actuated to recall a word back from the entry word in the memory means.

3. The dictionary of claim 1, wherein the said memory means comprises a read-only memory, a random access memory, a bubble memory or a floppy disk memory.

4. The dictionary of claim 1 wherein said means for displaying develops a television picture from said related information.

5. The electronic dictionary as claimed in claim 1, wherein said video information further includes moving picture information.

6. An electronic dictionary for use in an information retrieval system comprising:

information disk means for recording information related to words to be defined or translated, said information disk means having a plurality of concentric information tracks, said concentric information tracks including an audio information track and a predetermined number of picture information tracks related to each word, said audio information track contains audio information related to the word to be defined or translated, said picture information tracks contain picture information related to the word to be defined or translated;

input means for entering an entry word to be defined or translated;

memory means for storing each said word to be defined or translated and track number information corresponding to each of said words on said information disk means, said track number information including a first track number and a second track number for each of said words;

searching means, responsive to said entered word, for searching said memory means to locate and retrieve said track number information corresponding to said information disk means of said entered word;

first buffer means, responsive to said searching means, for storing said first track number;

second buffer means, responsive to said searching means, for storing said second track number;

control means, responsive to said first buffer means and said second buffer means, for driving the information disk means to retrieve said audio information and said picture information corresponding to said first track number and said second track number of said entered word, said audio information being located at a track number one less than said first track number, said picture information beginning at said first track number and ending at said second track number;

audio memory means, responsive to said information disk means, for storing said audio information from said information disk means for said entered word; and display means, responsive to said information disk means, for displaying said picture information from said information disk means for said entered word.

7. The electronic dictionary as claimed in claim 6, further comprising:

sound means, responsive to said audio memory means, for producing sounds representing said audio information of said entered word.

8. The electronic dictionary as claimed in claim 6, wherein said picture information contains at least still picture information.

9. The electronic dictionary as claimed in claim 6, wherein said picture information contains still picture information and moving picture information.

10. The electronic dictionary as claimed in claim 6, wherein said display means comprises a television set means for displaying a television picture.

11. The electronic dictionary as claimed in claim 7, wherein said input means comprises:

alphabet keys to provide the entry word;

translation key to translate said entry word into said track number information for said information disk means;

clear key to clear said entry word from said input means;

search key to display words similar to said entry word on said display means;

speech key to activate said electronic dictionary to output said audio information of said entry word through said sound means;

usage key to display said picture information of said entry word;

next key to retrieve from said memory means the track number information of the next word following said entry word in said memory means and to dispaly the next word; and back key to retrieve from said memory means the track number information of the prior word before said entry word in said memory means and to display the prior word.

12. The electronic dictionary as claimed in claim 6, wherein said memory means comprises a read-only memory, a random access memory, a bubble memory or a floppy disk memory.

* * * * *